United States Patent [19]

Wakamiya

[11] 4,448,497
[45] May 15, 1984

[54] GREAT APERTURE RATIO LENS

[75] Inventor: Koichi Wakamiya, Tokyo, Japan

[73] Assignee: Nippon Kogaku K. K., Tokyo, Japan

[21] Appl. No.: 360,564

[22] Filed: Mar. 22, 1982

[30] Foreign Application Priority Data

Mar. 31, 1981 [JP] Japan .................................. 56-47849

[51] Int. Cl.³ .............................................. G02B 9/62
[52] U.S. Cl. .................................................. 350/464
[58] Field of Search ......................................... 350/464

[56] References Cited

U.S. PATENT DOCUMENTS

| | | | |
|---|---|---|---|
| 3,738,736 | 6/1973 | Shimizu | 350/464 |
| 3,743,387 | 7/1973 | Nakagawa | 350/464 |
| 3,984,155 | 10/1976 | Nakagawa | 350/464 |
| 4,099,843 | 7/1978 | Imai | 350/464 |
| 4,110,007 | 8/1978 | Ikeda | 350/464 |
| 4,247,171 | 0/1981 | Tsuji | 350/464 |
| 4,364,643 | 12/1982 | Momiyama | 350/464 |

FOREIGN PATENT DOCUMENTS

2922742 12/1979 Fed. Rep. of Germany ...... 350/464

*Primary Examiner*—John K. Corbin
*Assistant Examiner*—Scott J. Sugarman
*Attorney, Agent, or Firm*—Shapiro and Shapiro

[57] ABSTRACT

A great aperture ratio lens includes a first lens which is a positive meniscus lens having its convex surface facing the object side, a second lens which is a positive meniscus lens having its convex surface facing the object side, a third lens which is a negative meniscus lens having its convex surface facing the object side, a fourth lens which is a negative lens having its concave surface facing the object side, a fifth lens which is a positive lens having its convex surface facing the image side, a sixth lens which is a positive meniscus lens having its convex surface facing the image side, and a seventh lens which is a positive lens. The fourth lens and the fifth lens are cemented to each other. The great aperture ratio lens satisfies certain conditions.

9 Claims, 9 Drawing Figures

GREAT APERTURE RATIO LENS

BACKGROUND OF THE INVENTION

1. Field of the Invention

This invention relates to a 6-group 7-lens modified Gauss type phototaking lens which has an angle of view 46° and a brightness amounting to about F1.4 and which is compact and has a great quantity of marginal light.

2. Description of the Prior Art

Generally, Guass type lenses have a relatively flat image plane and permit their back focal length to be selected to about 0.7f or longer and therefore, are often used as a great aperture ratio lens such as, for example, a single lens reflex which requires a relatively long back focal length, but most of them have about 10%–23% of aperture efficiency at an incidence angle of 23° with respect to off-axis light rays and have a disadvantage that decrease in quantity of marginal light is salient.

To increase aperture efficiency, that is, to reduce the vignetting of lens, a method of increasing the diameter of the foremost lens which limits the off-axis light beam and the diameter of the rearmost lens and a method of reducing the full length of the lens are conceivable, but increasing the lens diameter prevents the lens from becoming compact and increased diameter of the foremost lens leads to bulkiness of the attachment connected immediately before the foremost lens and increased diameter of the rearmost lens leads to bulkiness of the device around the lens such as increased diameter of the lens mounting surface with respect to the camera body provided near the rearmost lens, and these are not preferable. Also, reducing the full length of the lens is effective as the means for increasing the quantity of marginal light without increasing the diameter of the lens while, on the other hand, it leads to a sharp increase in coma flare and therefore, reducing the full length of the lens limitlessly is not desirable, and where the aperture efficiency of light ray of an incidence angle of 23° is about 25% even in the heretofore known compact type lens, the disadvantage that coma flare of light rays in the vicinity of an incidence angle of 6° becomes particularly excessive has been unavoidable.

SUMMARY OF THE INVENTION

It is an object of the present invention to overcome the above-noted difficulties and to provide a phototaking lens which has a long back focal length and yet which is compact and good in aberration balance and moreover high in aperture efficiency.

The invention will become fully apparent from the following detailed description thereof taken in conjunction with the accompanying drawings.

BRIEF DESCRIPTION OF THE DRAWINGS

FIG. 1 illustrates the present invention.

DESCRIPTION OF THE PREFFERED EMBODIMENTS

Figure 1:
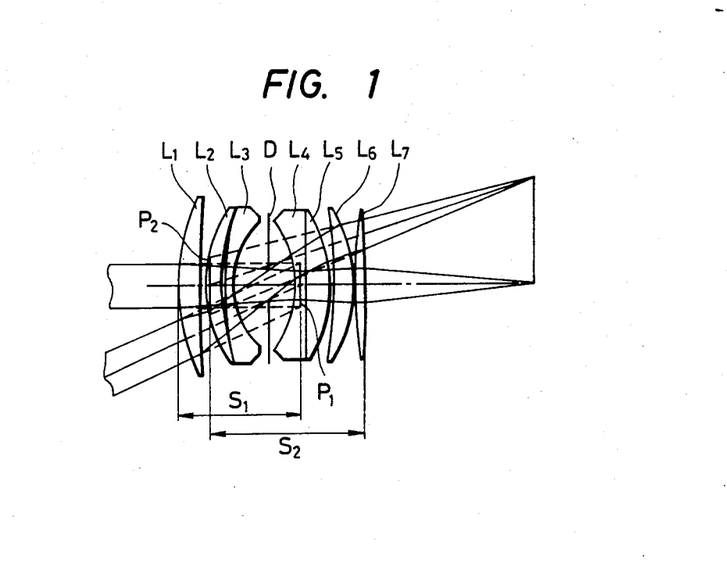

The lens system according to the present invention may be obtained by satisfying the following conditions in a 6-group 7-lens lens system wherein, as shown in FIG. 1, both a first lens $L_1$ and a second lens $L_2$ are a positive meniscus lens having its convex surface facing the object side, a third lens $L_3$ is a negative meniscus lens having its convex surface facing the object side, a fourth lens $L_4$ and a fifth lens $L_5$ are cemented to each other, the fourth lens $L_4$ being a negative lens having its concave surface facing the object side, the fifth lens $L_5$ being a positive lens having its convex surface facing the image side, a sixth lens $L_6$ is a positive meniscus lens facing its convex surface facing the image side, a seventh lens $L_7$ is a positive lens, and a diaphragm D is disposed between the third lens $L_3$ and the cemented lens comprising the fourth lens $L_4$ and the fifth lens $L_5$:

$$0.74f < l < 0.88f \tag{1}$$

$$0.94 < \frac{r_1}{f_1} + \frac{r_3}{f_2} < 1.05 \tag{2}$$

$$0.45 < \frac{|r_{11}|}{f_6} < 0.70 \tag{3}$$

$$0.65 < r_1/f_1 < 0.75 \tag{4}$$

$$1.35 < r_3/r_6 < 1.52 \tag{5}$$

$$1.17 < f_2/f_1 < 1.51 \tag{6}$$

where

- $r_i$: radius of curvature of the ith surface from the object side
- $d_i$: distance between the ith surface from the object side and the next surface
- $n_i$: refractive index of the ith lens from the object side
- $\nu_i$: Abbe number of the ith lens from the object side
- $f_i$: focal length of the ith lens from the object side
- l: full length of the lens system (distance from the foremost lens surface adjacent to the object side to the rearmost lens surface adjacent to the image side).

The present invention will hereinafter be described in more detail. Generally, in a Gauss type lens, the entrance pupil of the lens system lies adjacent to the image side with respect to the diaphragm and the exit pupil of the lens system lies adjacent to the object side with respect to the diaphragm. To obtain a greater aperture efficiency while minimizing the lens effective apertures of the first lens and the seventh lens, as is apparent from FIG. 1, it is more advantageous to make small the spacing $S_1$ from the first lens to the entrance pupil $P_1$ and the spacing $S_2$ from the exit pupil $P_2$ to the last lens and for this purpose, it is effective to bring the exit pupil $P_2$ close to the diaphragm and at the same time minimize the full length of the lens system. Since the entrance pupil $P_1$ is the virtual image of the diaphragm D by the lens positioned adjacent to the object side with respect to the diaphragm (the forward group lens) and the exit pupil $P_2$ is the virtual image of the diaphragm D by the lens positioned adjacent to the image side with respect to the diaphragm D (the rearward group lens), both the distance from the rearward principal point of the forward group lens to the diaphragm and the distance from the forward principal point of the rearward group lens to the diaphragm may be small in order to bring the entrance pupil and the exit pupil close to the diaphragm. Conditions (1), (2) and (3) are effective conditions for sufficiently securing the aperture efficiency with these taken into account.

If the upper limit of condition (1) is exceeded, the full length of the lens system will increase to hamper the compactness of the system and at the same time, it will become difficult to secure the aperture efficiency sufficiently. If the lower limit of condition (1) is exceeded, coma flare of a relatively small angle in the vicinity of an incidence angle of 6° will become so excessive that it cannot be corrected. Condition (2) prescribes the amount of bending by which the first lens $L_1$ and the second lens $L_2$ are bent, and condition (3) prescribes the amount of bending by which the sixth lens $L_6$ is bent, and each of said lenses is a convex maniscus lens having its convex surface facing the diaphragm side and has the function of bringing the principal points of the forward group lens and the rearward group lens closer to the diaphragm as the amount of bending of said lenses is smaller, and for the reason set forth above, this is advantageous for making the lens system compact and improving the aperture efficiency. In addition, as the amount of bending of the convex lens becomes smaller, the degree to which spherical aberration is drawn in the negative sense is decreased and therefore, the power of the concave lens for correcting spherical aberration in the positive sense can be weakened, thereby decreasing creation of the coma flare created by the diverging action of the concave lens, particularly, the coma flare of a relatively small angle in the vicinity of an incidence angle of 6°. If the lower limit of condition (2) or (3) is exceeded, coma flare will become salient and it will particularly be difficult to prevent creation of the coma flare of a small angle in the vicinity of an incidence angle of 6°.

If the upper limit of condition (2) is exceeded, the meridional image plane will be strongly drawn in the negative sense and the correction thereof will be difficult.

The bending of the sixth lens $L_6$ in condition (3) imparts a strong influence particularly to spherical aberration. Weakening the bending of the sixth lens $L_6$ has the effect of reducing the amount of strong negative spherical aberration created in the sixth lens and is desirable for a great aperture ratio lens, but at the same time, there arises the necessity of balancing spherical aberration by reducing the power of the convex lens such as the third lens $L_3$ or the fourth lens $L_4$ and as a result, Petzval sum tends toward the positive sense. If the upper limit of condition (3) is exceeded, it will be difficult to correct spherical aberration and Petzval sum at a time. To cause Petzval sum to tend toward the negative sense, it is generally known to make the refractive index of the convex lens as high as possible, but in order that the present invention may be satisfied, it is desirable that the average value of the refractive indices of the first lens $L_1$, the second lens $L_2$, the sixth lens $L_6$ and the seventh lens $L_7$ be higher than 1.75 and less than 1.85. If the upper limit is exceeded, dispersion of glass will become great and therefore, correction of on-axis chromatic aberration will become difficult.

Condition (4), in addition to condition (2), further prescribes the bending range of the first lens $L_1$. By the bending of the first lens $L_1$ being intensified, spherical aberration is caused to tend toward the negative sense, but when spherical aberration is corrected with the refracting action of the concave lens being intensified, spherical aberration will become negative with regard to light rays of small incidence height and the bulge of spherical aberration will increase. If the lower limit of condition (4) is exceeded, correction of the bulge of spherical aberration will become difficult. The bulge of spherical aberration becomes easier to correct as the bending of the first lens $L_1$ becomes weaker, but the radius of curvature of the second surface becomes greater and gradually approaches a plane and therefore, off-axis light rays gradually become deviated from a minimum declination relative to the first lens and are more refracted, thus creating lateral chromatic aberration. If the upper limit of condition (4) is exceeded, the declination of the off-axis light rays relative to the first lens will become greater and therefore, light rays of short wavelength relative to the reference wavelength remarkably create positive lateral chromatic aberration which cannot be corrected. In order to prevent creation of lateral chromatic aberration, it is necessary that the bending of the first lens be strong within the range of condition (4). Further, as a condition for preventing creation of lateral chromatic aberration and bulge of spherical aberration, it is desirable that the Abbe number $\nu_1$ of the first lens $L_1$ be $\nu_1 > 39$.

Condition (5) is for keeping coma in a good condition. Both the second lens $L_2$ which is a positive meniscus lens and the third lens $L_3$ which is a negative meniscus lens are disposed in nearly aplanatic conditions and when the radii of curvature of the second and third lenses are varied, the aplanatism is destroyed and deviates from sine condition, but it is possible to satisfy the sine condition by making the radii of curvature of both the third surface and the sixth surface either great or small, that is, by determining the ratio $r_3/r_6$ of the radii of curvature of the third and sixth surfaces to a predetermined range. If the lower limit of condition (5) is exceeded, the sine condition will be destroyed and particularly, coma flare of light rays incident from below relative to the principal ray will increase. If the upper limit of condition (5) is exceeded, the sine condition will be destroyed and particularly, coma flare of light rays incident from above relative to the principal ray will increase.

Condition (6) is for maintaining the back focal length at 0.7f or more and keeping distortion good.

In a single lens reflex camera or the like, a distance greater than a predetermined value must be provided between the last lens surface and the image plane. Generally, the optimum back focal length of a Gauss type lens is shorter than 0.7f and is of the order of 0.5f–0.6f, and to elongate this back focal length to 0.7f or more, the refractive power of the forward group lens must be weakened and therefore, distortion has a tendency to exhibit a negative value.

This negative distortion is corrected by making the refractive power of the first lens $L_1$ remotest from the diaphragm of the forward group lens relatively great as compared with the refractive power of the second lens $L_2$. If the lower limit of condition (6) is exceeded, distortion will become negative and will not be corrected.

As the value of condition (6) becomes greater, it causes the value of distortion to tend toward the positive sense and makes correction easy, while on the other hand the refractive power of the first lens becomes relatively strong and therefore, if the upper limit of this condition is exceeded, the back focal length cannot be maintained at 0.7f or more.

Figure 2:
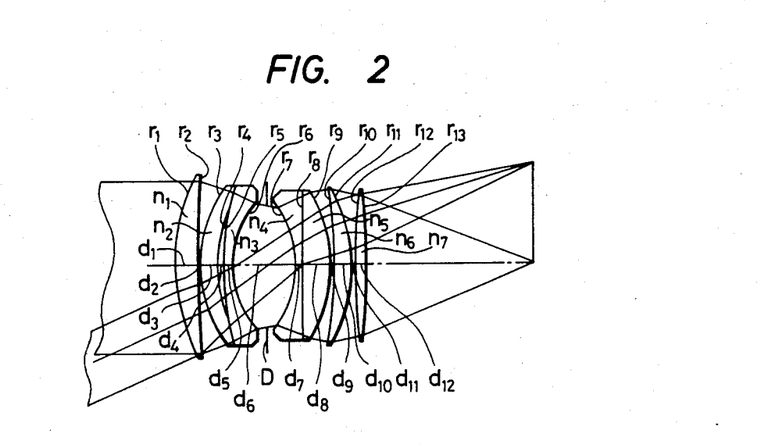
FIG. 2 is a cross-sectional view of the lens of the present invention.
Figure 3:
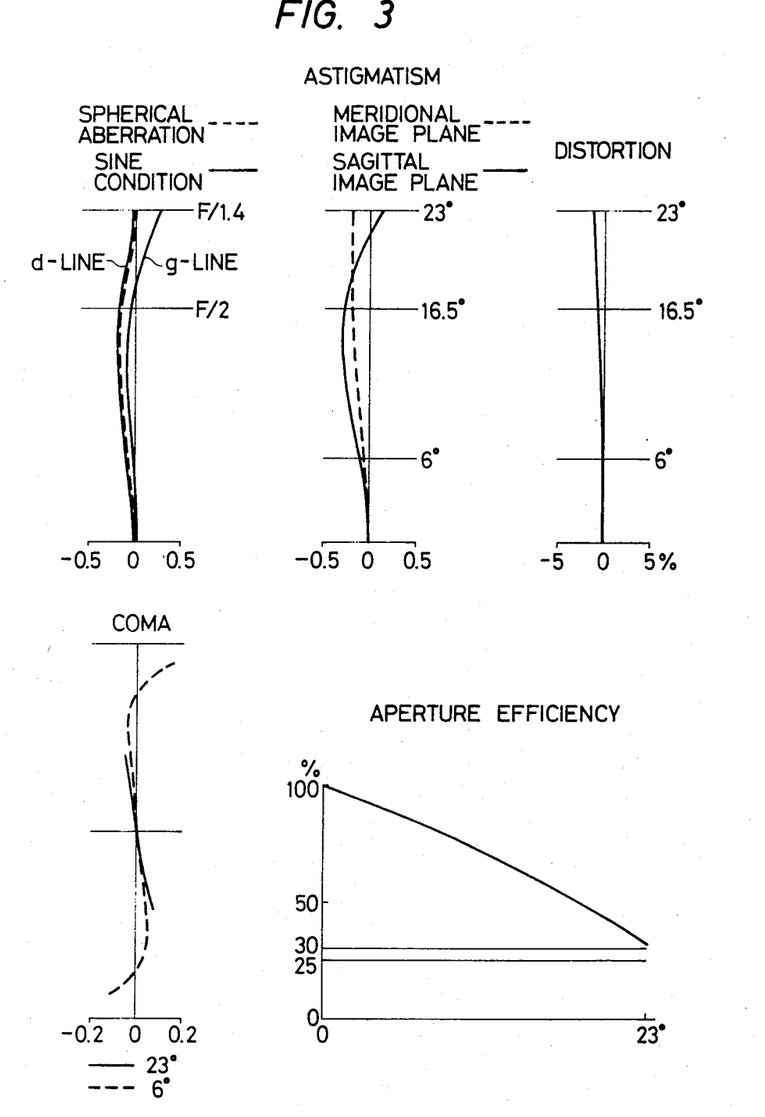
FIG. 3 shows the various aberrations and the quantity of light in a first embodiment of the present invention.
Figure 4:
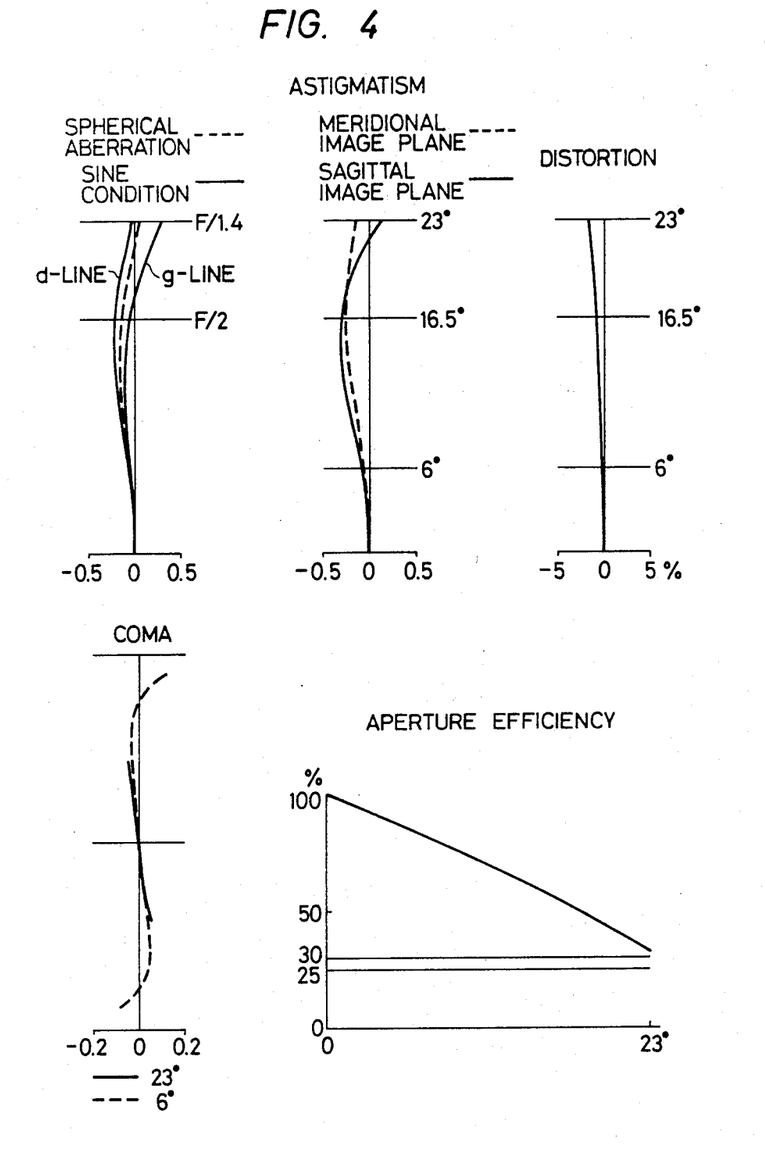
FIG. 4 shows the various aberrations and the quantity of light in a second embodiment of the present invention.
Figure 5:
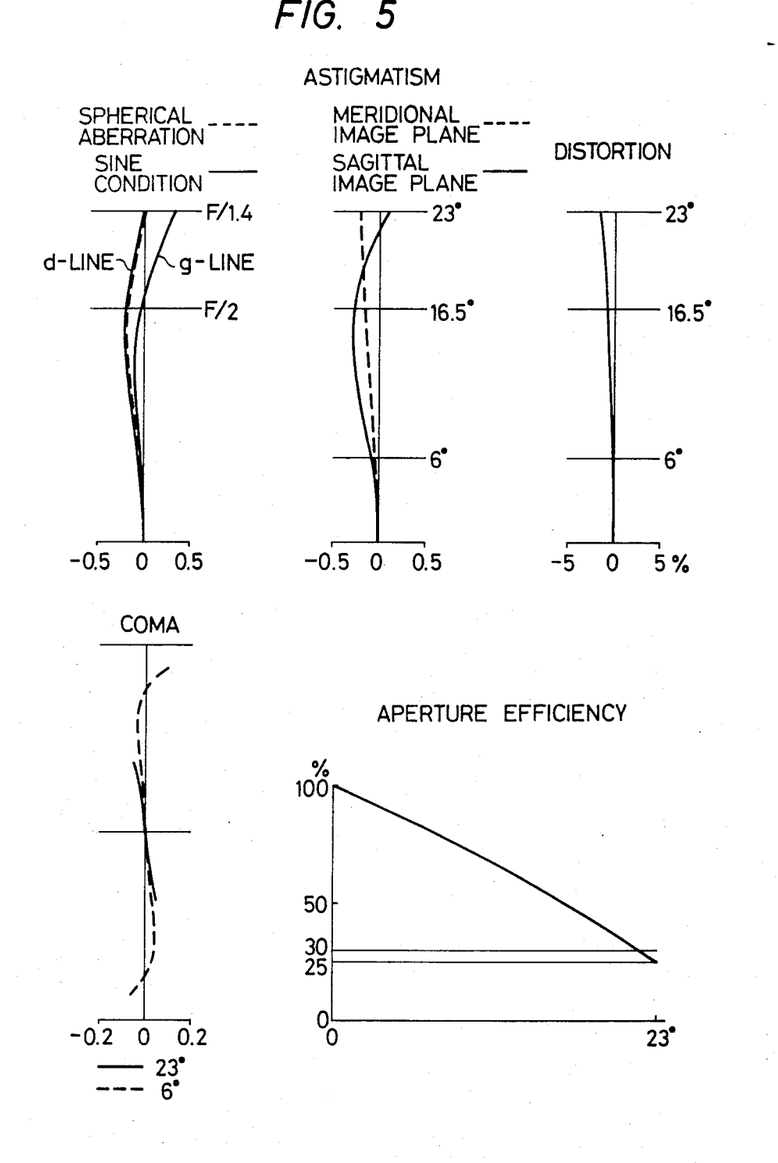
FIG. 5 shows the various aberrations and the quantity of light in a third embodiment of the present invention.
Figure 6:
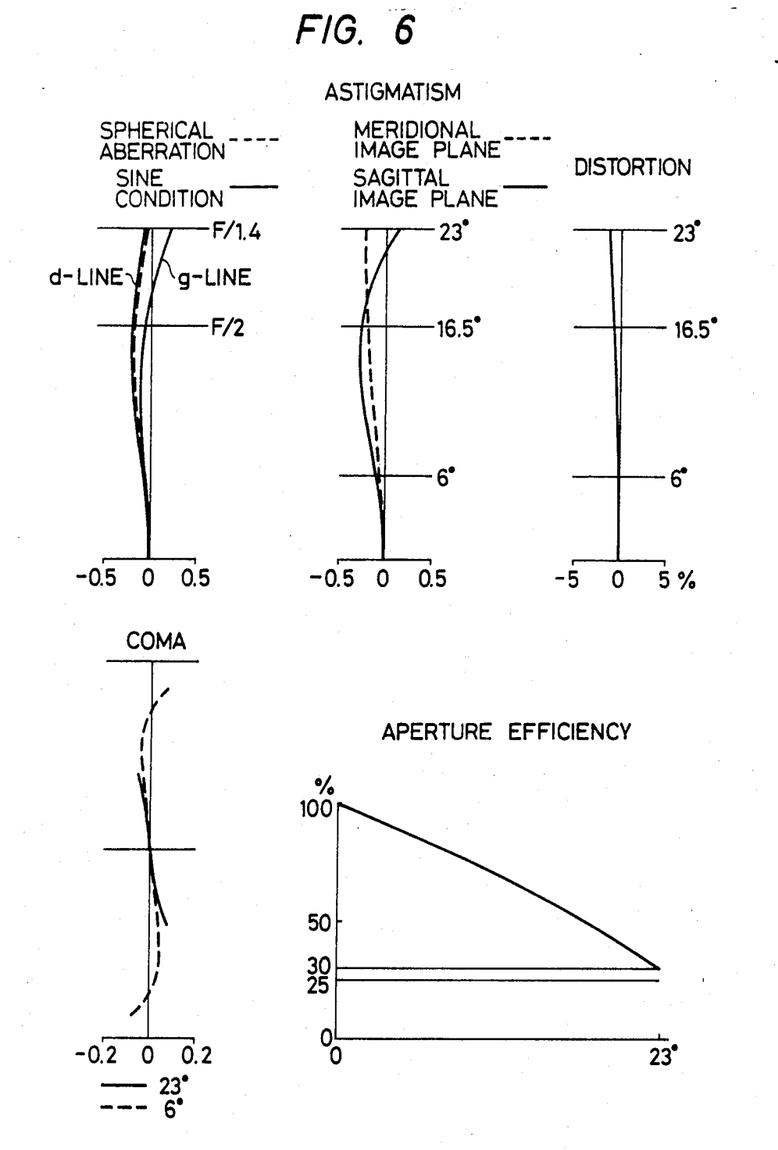
FIG. 6 shows the various aberrations and the quantity of light in a fourth embodiment of the present invention.
Figure 7:
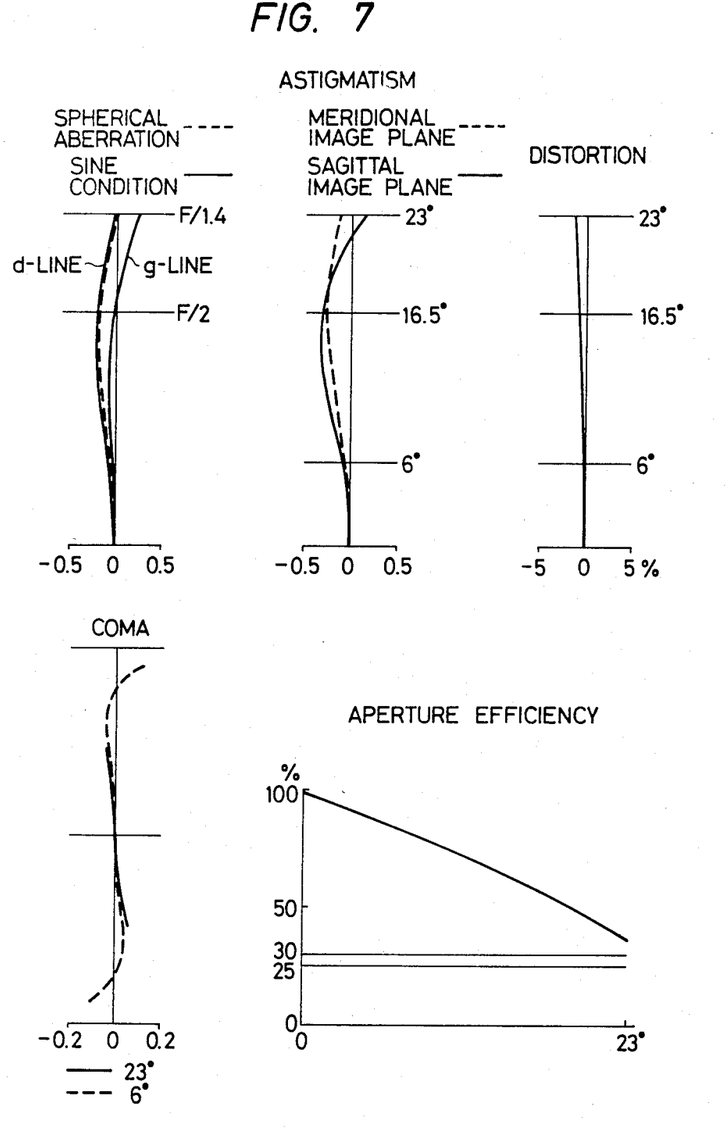
FIG. 7 shows the various aberrations and the quantity of light in a fifth embodiment of the present invention.
Figure 8:
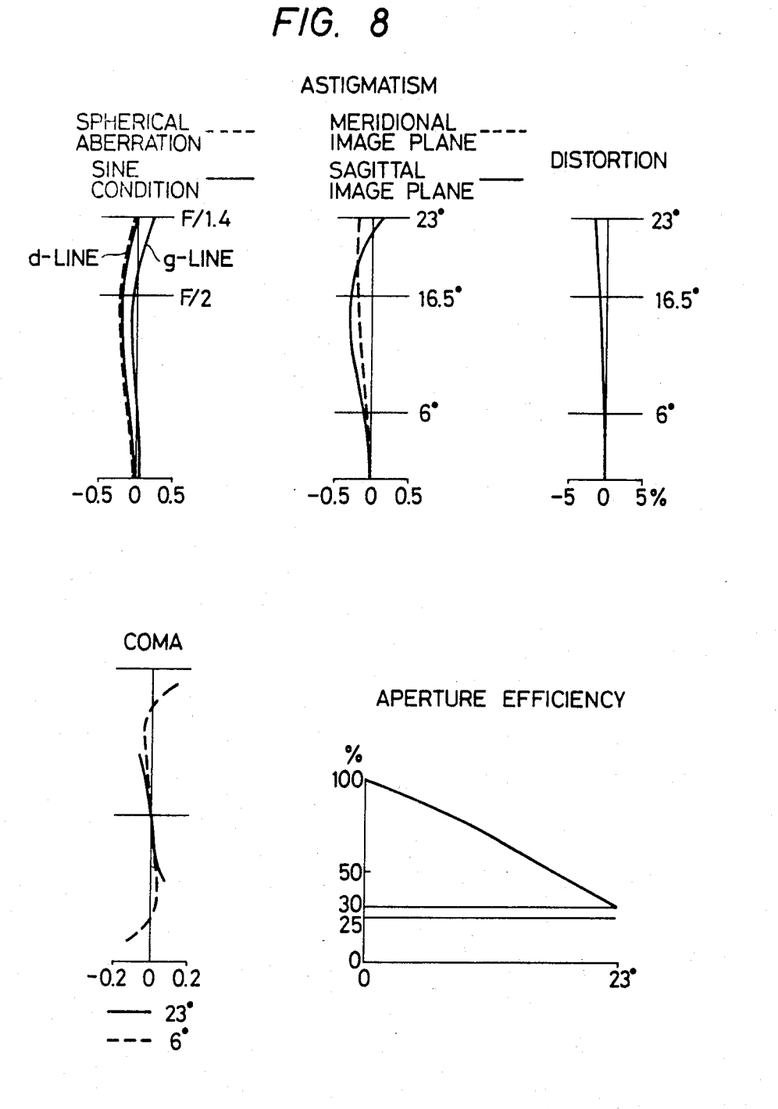
FIG. 8 shows the various aberrations and the quantity of light in a sixth embodiment of the present invention.
Figure 9:
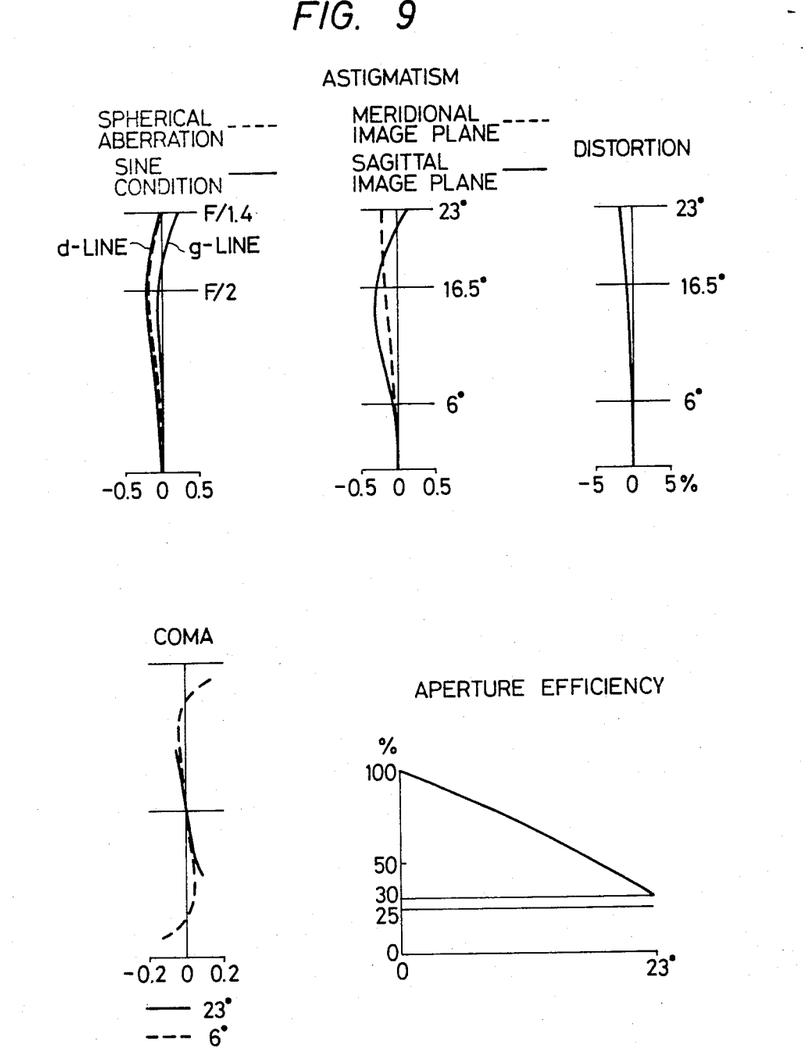
FIG. 9 shows the various aberrations and the quantity of light in a seventh embodiment of the present invention.

The numerical data of some preferred embodiments of the present invention will be shown below. In the tables below, $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, \ldots$ represent the refractive indices of the respective lenses, and $\nu_1, \nu_2, \ldots$ represent the Abbe numbers of the respective lenses. Each parameter is as shown in FIG. 2 which shows the construction of the lens according to the present invention. Marginal ray incident from the infinity object point on the optical axis and oblique ray of a maximum angle of view are also shown in FIG. 2.

First Embodiment

Focal length f = 100  F-number 1.4  Angle of view $2\omega = 46°$ d-line

| | | | |
|---|---|---|---|
| $r_1 = +78.360$ | $d_1 = 9.8837$ | $n_1 = 1.79668$ | $\nu_1 = 45.5$ |
| $r_2 = +469.477$ | $d_2 = 0.1938$ | | |
| $r_3 = +50.297$ | $d_3 = 9.1085$ | $n_2 = 1.77279$ | $\nu_2 = 49.4$ |
| $r_4 = +74.376$ | $d_4 = 2.9457$ | | |
| $r_5 = +138.143$ | $d_5 = 2.3256$ | $n_3 = 1.67270$ | $\nu_3 = 32.2$ |
| $r_6 = +34.326$ | $d_6 = 29.0698$ | | |
| $r_7 = -34.407$ | $d_7 = 1.9380$ | $n_4 = 1.7400$ | $\nu_4 = 28.3$ |
| $r_8 = -2906.977$ | $d_8 = 12.4031$ | $n_5 = 1.77279$ | $\nu_5 = 49.4$ |
| $r_9 = -59.047$ | $d_9 = 0.3876$ | | |
| $r_{10} = -150.021$ | $d_{10} = 8.3333$ | $n_6 = 1.78797$ | $\nu_6 = 47.5$ |
| $r_{11} = -57.890$ | $d_{11} = 0.1938$ | | |
| $r_{12} = +284.630$ | $d_{12} = 5.0388$ | $n_7 = 1.78797$ | $\nu_7 = 47.5$ |
| $r_{13} = -253.217$ | | | |

Back focal length 74.1
Full length of lens $l = 81.8217$
$f_1 = 116.8$
$f_2 = 172.6$
$f_6 = 115.0$

Second Embodiment

Focal length f = 100  F-number 1.4  Angle of view $2\omega = 46°$ d-line

| | | | |
|---|---|---|---|
| $r_1 = +83.064$ | $d_1 = 9.3023$ | $n_1 = 1.84042$ | $\nu_1 = 43.3$ |
| $r_2 = +449.017$ | $d_2 = 0.1938$ | | |
| $r_3 = +51.831$ | $d_3 = 9.1085$ | $n_2 = 1.84042$ | $\nu_2 = 43.3$ |
| $r_4 = +75.384$ | $d_4 = 2.9070$ | | |
| $r_5 = +135.659$ | $d_5 = 2.3256$ | $n_3 = 1.69895$ | $\nu_3 = 30.1$ |
| $r_6 = +35.592$ | $d_6 = 29.0698$ | | |
| $r_7 = -35.368$ | $d_7 = 2.1318$ | $n_4 = 1.74077$ | $\nu_4 = 27.6$ |
| $r_8 = -3875.969$ | $d_8 = 12.9845$ | $n_5 = 1.77279$ | $\nu_5 = 49.4$ |
| $r_9 = -57.484$ | $d_9 = 0.3876$ | | |
| $r_{10} = -180.589$ | $d_{10} = 8.5271$ | $n_6 = 1.80411$ | $\nu_6 = 46.4$ |
| $r_{11} = -62.298$ | $d_{11} = 0.1938$ | | |
| $r_{12} = +253.620$ | $d_{12} = 4.6512$ | $n_7 = 1.84042$ | $\nu_7 = 43.3$ |
| $r_{13} = -533.651$ | | | |

Back focal length 74.1
Full length of lens $l = 81.7830$
$f_1 = 119.9$
$f_2 = 167.8$
$f_6 = 114.6$

Third Embodiment

Focal length f = 100  F-number 1.4  Angle of view $2\omega = 46°$ d-line

| | | | |
|---|---|---|---|
| $r_1 = +91.771$ | $d_1 = 9.3023$ | $n_1 = 1.79668$ | $\nu_1 = 45.5$ |
| $r_2 = +666.157$ | $d_2 = 0.1938$ | | |
| $r_3 = +52.936$ | $d_3 = 9.1085$ | $n_2 = 1.78797$ | $\nu_2 = 47.5$ |
| $r_4 = +84.525$ | $d_4 = 2.7132$ | | |
| $r_5 = +152.076$ | $d_5 = 5.2326$ | $n_3 = 1.67270$ | $\nu_3 = 32.2$ |
| $r_6 = +35.322$ | $d_6 = 31.3954$ | | |
| $r_7 = -34.070$ | $d_7 = 2.1318$ | $n_4 = 1.74000$ | $\nu_4 = 28.3$ |
| $r_8 = -5813.951$ | $d_8 = 12.2093$ | $n_5 = 1.77279$ | $\nu_5 = 49.4$ |
| $r_9 = -56.597$ | $d_9 = 0.3876$ | | |
| $r_{10} = -146.506$ | $d_{10} = 8.3333$ | $n_6 = 1.78797$ | $\nu_6 = 47.5$ |
| $r_{11} = -58.186$ | $d_{11} = 0.1938$ | | |
| $r_{12} = +264.221$ | $d_{12} = 5.2326$ | $n_7 = 1.78797$ | $\nu_7 = 47.5$ |
| $r_{13} = -258.486$ | | | |

Back focal length 74.1
Full length of lens $l = 86.4342$
$f_1 = 132.6$
$f_2 = 159.5$
$f_6 = 117.6$

Fourth Embodiment

Focal length f = 100  F-number 1.4  Angle of view $2\omega = 46°$ d-line

| | | | |
|---|---|---|---|
| $r_1 = +86.771$ | $d_1 = 9.8837$ | $n_1 = 1.80218$ | $\nu_1 = 44.7$ |
| $r_2 = +592.843$ | $d_2 = 0.1938$ | | |
| $r_3 = +50.839$ | $d_3 = 9.6899$ | $n_2 = 1.78797$ | $\nu_2 = 47.5$ |
| $r_4 = +75.826$ | $d_4 = 2.9070$ | | |
| $r_5 = +141.066$ | $d_5 = 2.7132$ | $n_3 = 1.67270$ | $\nu_3 = 32.2$ |
| $r_6 = +34.981$ | $d_6 = 29.6512$ | | |
| $r_7 = -34.459$ | $d_7 = 1.9380$ | $n_4 = 1.74000$ | $\nu_4 = 28.3$ |
| $r_8 = +9689.922$ | $d_8 = 12.9845$ | $n_5 = 1.77279$ | $\nu_5 = 49.4$ |
| $r_9 = -56.876$ | $d_9 = 0.3876$ | | |
| $r_{10} = -179.516$ | $d_{10} = 8.1395$ | $n_6 = 1.78797$ | $\nu_6 = 47.5$ |
| $r_{11} = -60.444$ | $d_{11} = 0.1938$ | | |
| $r_{12} = +277.190$ | $d_{12} = 5.4264$ | $n_7 = 1.78797$ | $\nu_7 = 47.5$ |
| $r_{13} = -331.492$ | | | |

Back focal length 74.1
Full length of lens $l = 84.1086$
$f_1 = 125.6$
$f_2 = 167.2$
$f_6 = 112.3$

Fifth Embodiment

Focal length f = 100  F-number 1.4  Angle of view $2\omega = 46°$ d-line

| | | | |
|---|---|---|---|
| $r_1 = +83.878$ | $d_1 = 9.3023$ | $n_1 = 1.84042$ | $\nu_1 = 43.3$ |
| $r_2 = +539.981$ | $d_2 = 0.1938$ | | |
| $r_3 = +50.570$ | $d_3 = 9.1085$ | $n_2 = 1.84042$ | $\nu_2 = 43.3$ |
| $r_4 = +73.376$ | $d_4 = 3.2946$ | | |
| $r_5 = +145.876$ | $d_5 = 1.9380$ | $n_3 = 1.71736$ | $\nu_3 = 29.5$ |
| $r_6 = +36.141$ | $d_6 = 25.1938$ | | |
| $r_7 = -36.975$ | $d_7 = 2.1318$ | $n_4 = 1.74077$ | $\nu_4 = 27.6$ |
| $r_8 = -3875.969$ | $d_8 = 12.9845$ | $n_5 = 1.77279$ | $\nu_5 = 49.4$ |
| $r_9 = -62.186$ | $d_9 = 0.1938$ | | |
| $r_{10} = -268.975$ | $d_{10} = 8.5271$ | $n_6 = 1.80411$ | $\nu_6 = 46.4$ |
| $r_{11} = -66.533$ | $d_{11} = 0.1938$ | | |
| $r_{12} = +421.089$ | $d_{12} = 4.6512$ | $n_7 = 1.84042$ | $\nu_7 = 43.3$ |
| $r_{13} = -321.521$ | | | |

Back focal length 74.1
Full length of lens $l = 77.7132$
$f_1 = 117.1$
$f_2 = 163.7$
$f_6 = 107.9$

Sixth Embodiment

Focal length f = 100  F-number 1.4  Angle of view $2\omega = 46°$ d-line

| | | | |
|---|---|---|---|
| $r_1 = +77.147$ | $d_1 = 10.2713$ | $n_1 = 1.79668$ | $\nu_1 = 45.5$ |
| $r_2 = +447.250$ | $d_2 = 0.1938$ | | |
| $r_3 = +50.091$ | $d_3 = 8.7209$ | $n_2 = 1.77279$ | $\nu_2 = 49.4$ |
| $r_4 = +74.440$ | $d_4 = 3.0039$ | | |
| $r_5 = +138.023$ | $d_5 = 2.3256$ | $n_3 = 1.67270$ | $\nu_3 = 32.2$ |
| $r_6 = +34.029$ | $d_6 = 29.6512$ | | |
| $r_7 = -34.029$ | $d_7 = 1.9380$ | $n_4 = 1.74000$ | $\nu_4 = 28.3$ |
| $r_8 = -1939.109$ | $d_8 = 12.0155$ | $n_5 = 1.77279$ | $\nu_5 = 49.4$ |
| $r_9 = -58.622$ | $d_9 = 0.1938$ | | |
| $r_{10} = -143.640$ | $d_{10} = 8.7209$ | $n_6 = 1.78797$ | $\nu_6 = 47.5$ |
| $r_{11} = -56.897$ | $d_{11} = 0.1938$ | | |
| $r_{12} = +299.826$ | $d_{12} = 5.4264$ | $n_7 = 1.78797$ | $\nu_7 = 47.5$ |
| $r_{13} = -231.966$ | | | |

Back focal length 74.1
Full length of lens $l = 82.6551$
$f_1 = 115.6$
$f_2 = 171.4$
$f_6 = 114.5$

Seventh Embodiment

Focal length f = 100  F-number 1.4  Angle of view $2\omega = 46°$ d-line

| | | | |
|---|---|---|---|
| $r_1 = +78.899$ | $d_1 = 9.8837$ | $n_1 = 1.79668$ | $\nu_1 = 45.5$ |
| $r_2 = +469.364$ | $d_2 = 0.1938$ | | |
| $r_3 = +49.769$ | $d_3 = 9.1085$ | $n_2 = 1.79631$ | $\nu_2 = 41.0$ |
| $r_4 = +73.514$ | $d_4 = 2.9457$ | | |

-continued

| | | | |
|---|---|---|---|
| $r_5 = +131.329$ | $d_5 = 2.3256$ | $n_3 = 1.69895$ | $\nu_3 = 30.1$ |
| $r_6 = +34.200$ | $d_6 = 29.0698$ | | |
| $r_7 = -34.244$ | $d_7 = 1.9380$ | $n_4 = 1.74077$ | $\nu_4 = 27.6$ |
| $r_8 = -775.194$ | $d_8 = 12.4031$ | $n_5 = 1.77279$ | $\nu_5 = 49.4$ |
| $r_9 = -58.357$ | $d_9 = 0.3876$ | | |
| $r_{10} = -175.000$ | $d_{10} = 8.3333$ | $n_6 = 1.78797$ | $\nu_6 = 47.5$ |
| $r_{11} = -59.136$ | $d_{11} = 0.1938$ | | |
| $r_{12} = +347.140$ | $d_{12} = 5.0388$ | $n_7 = 1.79668$ | $\nu_7 = 45.5$ |
| $r_{13} = -246.935$ | | | |

Back focal length 74.1
Full length of lens l = 81.8217
$f_1 = 117.7$
$f_2 = 165.4$
$f_6 = 109.9$ The various aberrations in the first to seventh embodiments and the characteristics of aperture efficiency for showing the quantity of light are shown in FIGS. 3-9. It will be seen from these figures that each embodiment, in spite of its great aperture of F-number 1.4, has at least 25% of aperture efficiency at a maximum angle of view and has a great quantity of marginal light amounting to maximum 40%. Each embodiment maintains a more compact shape than that of the conventional lens and has various aberrations corrected very well while having such a great quantity of marginal light and the coma which will become a great cause of flare has good symmetry.

As shown in the above-described embodiments, according to the present invention, there is provided a phototaking lens which has a long back focal length and yet which is compact and good in aberration balance and moreover high in aperture efficiency.

I claim:

1. A great aperture ratio lens having a long back focal length and high aperture efficiency and being good in aberration balance, including a first lens which is a positive meniscus lens having its convex surface facing the object side, a second lens which is a positive meniscus lens having its convex surface facing the object side, a third lens which is a negative meniscus lens having its convex surface facing the object side, a fourth lens which is a negative lens having its concave surface facing the object side, a fifth lens which is a positive lens having its convex surface facing the image side, a sixth lens which is a positive meniscus lens having its convex surface facing the image side, and a seventh lens which is a positive lens, said fourth lens and said fifth lens being cemented to each other, said great aperture ratio lens satisfying the following conditions:

$$0.74f < l < 0.88f \quad (1)$$

$$0.94 < \frac{r_1}{f_1} + \frac{r_3}{f_2} < 1.05 \quad (2)$$

$$0.45 < \frac{|r_{11}|}{f_6} < 0.70 \quad (3)$$

$$0.65 < r_1/f_1 < 0.75 \quad (4)$$

$$1.35 < r_3/r_6 < 1.52 \quad (5)$$

$$1.17 < f_2/f_1 < 1.51 \quad (6)$$

where
$r_i$: radius of curvature of the ith surface from the object side
$d_i$: distance between the ith surface from the object side and the next surface
$n_i$: refractive index of the ith lens from the object side
$\bar{\nu}_i$: Abbe number of the ith lens from the object side
$f_i$: focal length of the ith lens from the object side
l: full length of the lens (distance from the foremost lens surface on the object side to the rearmost lens surface on the image side).

2. A great aperture ratio lens according to claim 1, wherein the average value of the refractive indices of said first, second, sixth and seventh lenses is greater than 1.75 and less than 1.85, and the Abbe number of said first lens is greater than 39.

3. A great aperture ratio lens according to claim 2, wherein numerical data are as follows:

Focal length f = 100    F-number 1.4    Angle of view $2\omega = 46°$
d-line

| | | | |
|---|---|---|---|
| $r_1 = +78.360$ | $d_1 = 9.8837$ | $n_1 = 1.79668$ | $\nu_1 = 45.5$ |
| $r_2 = +469.477$ | $d_2 = 0.1938$ | | |
| $r_3 = +50.297$ | $d_3 = 9.1085$ | $n_2 = 1.77279$ | $\nu_2 = 49.4$ |
| $r_4 = +74.376$ | $d_4 = 2.9457$ | | |
| $r_5 = +138.143$ | $d_5 = 2.3256$ | $n_3 = 1.67270$ | $\nu_3 = 32.2$ |
| $r_6 = +34.326$ | $d_6 = 29.0698$ | | |
| $r_7 = -34.407$ | $d_7 = 1.9380$ | $n_4 = 1.7400$ | $\nu_4 = 28.3$ |
| $r_8 = -2906.977$ | $d_8 = 12.4031$ | $n_5 = 1.77279$ | $\nu_5 = 49.4$ |
| $r_9 = -59.047$ | $d_9 = 0.3876$ | | |
| $r_{10} = -150.021$ | $d_{10} = 8.3333$ | $n_6 = 1.78797$ | $\nu_6 = 47.5$ |
| $r_{11} = -57.890$ | $d_{11} = 0.1938$ | | |
| $r_{12} = +284.630$ | $d_{12} = 5.0388$ | $n_7 = 1.78797$ | $\nu_7 = 47.5$ |
| $r_{13} = -253.217$ | | | |

Back focal length 74.1
Full length of lens l = 81.8217
$f_1 = 116.8$
$f_2 = 172.6$
$f_6 = 115.0$ where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, \ldots$ represent the refractive indices of the respective lenses, and $\nu_1, \nu_2, \ldots$ represent the Abbe numbers of the respective lenses.

4. A great aperture ratio lens according to claim 2, wherein numerical data are as follows:

Focal length f = 100    F-number 1.4    Angle of view $2\omega = 46°$
d-line

| | | | |
|---|---|---|---|
| $r_1 = +83.064$ | $d_1 = 9.3023$ | $n_1 = 1.84042$ | $\nu_1 = 43.3$ |
| $r_2 = +449.017$ | $d_2 = 0.1938$ | | |
| $r_3 = +51.831$ | $d_3 = 9.1085$ | $n_2 = 1.84042$ | $\nu_2 = 43.3$ |
| $r_4 = +75.384$ | $d_4 = 2.9070$ | | |
| $r_5 = +135.659$ | $d_5 = 2.3256$ | $n_3 = 1.69895$ | $\nu_3 = 30.1$ |
| $r_6 = +35.592$ | $d_6 = 29.0698$ | | |
| $r_7 = -35.368$ | $d_7 = 2.1318$ | $n_4 = 1.74077$ | $\nu_4 = 27.6$ |
| $r_8 = -3875.969$ | $d_8 = 12.9845$ | $n_5 = 1.77279$ | $\nu_5 = 49.4$ |
| $r_9 = -57.484$ | $d_9 = 0.3876$ | | |
| $r_{10} = -180.589$ | $d_{10} = 8.5271$ | $n_6 = 1.80411$ | $\nu_6 = 46.4$ |
| $r_{11} = -62.298$ | $d_{11} = 0.1938$ | | |
| $r_{12} = +253.620$ | $d_{12} = 4.6512$ | $n_7 = 1.84042$ | $\nu_7 = 43.3$ |
| $r_{13} = -533.651$ | | | |

Back focal length 74.1
Full length of lens l = 81.7830
$f_1 = 119.9$
$f_2 = 167.8$
$f_6 = 114.6$ where $r_1, r_2, r_3, \ldots$ represent the radii of curvature of the successive lens surfaces from the object side, $d_1, d_2, d_3, \ldots$ represent the center thicknesses and air spaces of the respective lenses, $n_1, n_2, \ldots$ represent the refractive indices of the respective lenses, and $\nu_1, \nu_2, \ldots$ represent the Abbe numbers of the respective lenses.

5. A great aperture ratio lens according to claim 2, wherein numerical data are as follows:

| Focal length f = 100 | F-number 1.4 | Angle of view 2ω = 46° d-line | |
|---|---|---|---|
| $r_1$ = +91.771 | $d_1$ = 9.3023 | $n_1$ = 1.79668 | $\nu_1$ = 45.5 |
| $r_2$ = +666.157 | $d_2$ = 0.1938 | | |
| $r_3$ = +52.936 | $d_3$ = 9.1085 | $n_2$ = 1.78797 | $\nu_2$ = 47.5 |
| $r_4$ = +84.525 | $d_4$ = 2.7132 | | |
| $r_5$ = +152.076 | $d_5$ = 5.2326 | $n_3$ = 1.67270 | $\nu_3$ = 32.2 |
| $r_6$ = +35.322 | $d_6$ = 31.3954 | | |
| $r_7$ = −34.070 | $d_7$ = 2.1318 | $n_4$ = 1.74000 | $\nu_4$ = 28.3 |
| $r_8$ = −5813.951 | $d_8$ = 12.2093 | $n_5$ = 1.77279 | $\nu_5$ = 49.4 |
| $r_9$ = −56.597 | $d_9$ = 0.3876 | | |
| $r_{10}$ = −146.506 | $d_{10}$ = 8.3333 | $n_6$ = 1.78797 | $\nu_6$ = 47.5 |
| $r_{11}$ = −58.186 | $d_{11}$ = 0.1938 | | |
| $r_{12}$ = +264.221 | $d_{12}$ = 5.2326 | $n_7$ = 1.78797 | $\nu_7$ = 47.5 |
| $r_{13}$ = −258.486 | | | |
| Back focal length 74.1 | | | |
| Full length of lens l = 86.4342 | | | |
| $f_1$ = 132.6 | | | |
| $f_2$ = 159.5 | | | |
| $f_6$ = 117.6 | | | | where $r_1$, $r_2$, $r_3$, . . . represent the radii of curvature of the successive lens surfaces from the object side, $d_1$, $d_2$, $d_3$, . . . represent the center thicknesses and air spaces of the respective lenses, $n_1$, $n_2$, . . . represent the refractive indices of the respective lenses, and $\nu_1$, $\nu_2$, . . . represent the Abbe numbers of the respective lenses.

6. A great aperture ratio lens according to claim 2, wherein numerical data are as follows:

| Focal length f = 100 | F-number 1.4 | Angle of view 2ω = 46° d-line | |
|---|---|---|---|
| $r_1$ = +86.771 | $d_1$ = 9.8837 | $n_1$ = 1.80218 | $\nu_1$ = 44.7 |
| $r_2$ = +592.843 | $d_2$ = 0.1938 | | |
| $r_3$ = +50.839 | $d_3$ = 9.6899 | $n_2$ = 1.78797 | $\nu_2$ = 47.5 |
| $r_4$ = +75.826 | $d_4$ = 2.9070 | | |
| $r_5$ = +141.066 | $d_5$ = 2.7132 | $n_3$ = 1.67270 | $\nu_3$ = 32.2 |
| $r_6$ = +34.981 | $d_6$ = 29.6512 | | |
| $r_7$ = −34.459 | $d_7$ = 1.9380 | $n_4$ = 1.74000 | $\nu_4$ = 28.3 |
| $r_8$ = +9689.922 | $d_8$ = 12.9845 | $n_5$ = 1.77279 | $\nu_5$ = 49.4 |
| $r_9$ = −56.876 | $d_9$ = 0.3876 | | |
| $r_{10}$ = −179.516 | $d_{10}$ = 8.1395 | $n_6$ = 1.78797 | $\nu_6$ = 47.5 |
| $r_{11}$ = −60.444 | $d_{11}$ = 0.1938 | | |
| $r_{12}$ = +277.190 | $d_{12}$ = 5.4264 | $n_7$ = 1.78797 | $\nu_7$ = 47.5 |
| $r_{13}$ = −331.492 | | | |
| Back focal length 74.1 | | | |
| Full length of lens l = 84.1086 | | | |
| $f_1$ = 125.6 | | | |
| $f_2$ = 167.2 | | | |
| $f_6$ = 112.3 | | | | where $r_1$, $r_2$, $r_3$, . . . represent the radii of curvature of the successive lens surfaces from the object side, $d_1$, $d_2$, $d_3$, . . . represent the center thicknesses and air spaces of the respective lenses, $n_1$, $n_2$, . . . represent the refractive indices of the respective lenses, and $\nu_1$, $\nu_2$, . . . represent the Abbe numbers of the respective lenses.

7. A great aperture ratio lens according to claim 2, wherein numerical data are as follows:

| Focal length f = 100 | F-number 1.4 | Angle of view 2ω = 46° | |
|---|---|---|---|
| $r_1$ = +83.878 | $d_1$ = 9.3023 | $n_1$ = 1.84042 | $\nu_1$ = 43.3 |
| $r_2$ = +539.981 | $d_2$ = 0.1938 | | |
| $r_3$ = +50.570 | $d_3$ = 9.1085 | $n_2$ = 1.84042 | $\nu_2$ = 43.3 |
| $r_4$ = +73.376 | $d_4$ = 3.2946 | | |
| $r_5$ = +145.876 | $d_5$ = 1.9380 | $n_3$ = 1.71736 | $\nu_3$ = 29.5 |
| $r_6$ = +36.141 | $d_6$ = 25.1938 | | |
| $r_7$ = −36.975 | $d_7$ = 2.1318 | $n_4$ = 1.74077 | $\nu_4$ = 27.6 |
| $r_8$ = −3875.969 | $d_8$ = 12.9845 | $n_5$ = 1.77279 | $\nu_5$ = 49.4 |
| $r_9$ = −62.186 | $d_9$ = 0.1938 | | |
| $r_{10}$ = −268.975 | $d_{10}$ = 8.5271 | $n_6$ = 1.80411 | $\nu_6$ = 46.4 |
| $r_{11}$ = −66.533 | $d_{11}$ = 0.1938 | | |
| $r_{12}$ = +421.089 | $d_{12}$ = 4.6512 | $n_7$ = 1.84042 | $\nu_7$ = 43.3 |
| $r_{13}$ = −321.521 | | | |
| Back focal length 74.1 | | | |
| Full length of lens l = 77.7132 | | | |
| $f_1$ = 117.1 | | | |
| $f_2$ = 163.7 | | | |
| $f_6$ = 107.9 | | | | where $r_1$, $r_2$, $r_3$, . . . represent the radii of curvature of the successive lens surfaces from the object side, $d_1$, $d_2$, $d_3$, . . . represent the center thicknesses and air spaces of the respective lenses, $n_1$, $n_2$, . . . represent the refractive indices of the respective lenses, and $\nu_1$, $\nu_2$, . . . represent the Abbe numbers of the respective lenses.

8. A great aperture ratio lens according to claim 2, wherein numerical data are as follows:

| Focal length f = 100 | F-number 1.4 | Angle of view 2ω = 46° d-line | |
|---|---|---|---|
| $r_1$ = +77.147 | $d_1$ = 10.2713 | $n_1$ = 1.79668 | $\nu_1$ = 45.5 |
| $r_2$ = +447.250 | $d_2$ = 0.1938 | | |
| $r_3$ = +50.091 | $d_3$ = 8.7209 | $n_2$ = 1.77279 | $\nu_2$ = 49.4 |
| $r_4$ = +74.440 | $d_4$ = 3.0039 | | |
| $r_5$ = +138.023 | $d_5$ = 2.3256 | $n_3$ = 1.67270 | $\nu_3$ = 32.2 |
| $r_6$ = +34.029 | $d_6$ = 29.6512 | | |
| $r_7$ = −34.029 | $d_7$ = 1.9380 | $n_4$ = 1.74000 | $\nu_4$ = 28.3 |
| $r_8$ = −1939.109 | $d_8$ = 12.0155 | $n_5$ = 1.77279 | $\nu_5$ = 49.4 |
| $r_9$ = −58.622 | $d_9$ = 0.1938 | | |
| $r_{10}$ = −143.640 | $d_{10}$ = 8.7209 | $n_6$ = 1.78797 | $\nu_6$ = 47.5 |
| $r_{11}$ = −56.897 | $d_{11}$ = 0.1938 | | |
| $r_{12}$ = +299.826 | $d_{12}$ = 5.4264 | $n_7$ = 1.78797 | $\nu_7$ = 47.5 |
| $r_{13}$ = −231.966 | | | |
| Back focal length 74.1 | | | |
| Full length of lens l = 82.6551 | | | |
| $f_1$ = 115.6 | | | |
| $f_2$ = 171.4 | | | |
| $f_6$ = 114.5 | | | | where $r_1$, $r_2$, $r_3$, . . . represent the radii of curvature of the successive lens surfaces from the object side, $d_1$, $d_2$, $d_3$, . . . represent the center thicknesses and air spaces of the respective lenses, $n_1$, $n_2$, . . . represent the refractive indices of the respective lenses, and $\nu_1$, $\nu_2$, . . . represent the Abbe numbers of the respective lenses.

9. A great aperture ratio lens according to claim 2, wherein numerical data are as follows:

| Focal length f = 100 | F-number 1.4 | Angle of view 2ω = 46° d-line | |
|---|---|---|---|
| $r_1$ = +78.899 | $d_1$ = 9.8837 | $n_1$ = 1.79668 | $\nu_1$ = 45.5 |
| $r_2$ = +469.364 | $d_2$ = 0.1938 | | |
| $r_3$ = +49.769 | $d_3$ = 9.1085 | $n_2$ = 1.79631 | $\nu_2$ = 41.0 |
| $r_4$ = +73.514 | $d_4$ = 2.9457 | | |
| $r_5$ = +131.329 | $d_5$ = 2.3256 | $n_3$ = 1.69895 | $\nu_3$ = 30.1 |
| $r_6$ = +34.200 | $d_6$ = 29.0698 | | |
| $r_7$ = −34.244 | $d_7$ = 1.9380 | $n_4$ = 1.74077 | $\nu_4$ = 27.6 |
| $r_8$ = −775.194 | $d_8$ = 12.4031 | $n_5$ = 1.77279 | $\nu_5$ = 49.4 |
| $r_9$ = −58.357 | $d_9$ = 0.3876 | | |
| $r_{10}$ = −175.000 | $d_{10}$ = 8.3333 | $n_6$ = 1.78797 | $\nu_6$ = 47.5 |
| $r_{11}$ = −59.136 | $d_{11}$ = 0.1938 | | |
| $r_{12}$ = +347.140 | $d_{12}$ = 5.0388 | $n_7$ = 1.79668 | $\nu_7$ = 45.5 |
| $r_{13}$ = −246.935 | | | |
| Back focal length 74.1 | | | |
| Full length of lens l = 81.8217 | | | |
| $f_1$ = 117.7 | | | |
| $f_2$ = 165.4 | | | |
| $f_6$ = 109.9 | | | | where $r_1$, $r_2$, $r_3$, . . . represent the radii of curvature of the successive lens surfaces from the object side, $d_1$, $d_2$, $d_3$, . . . represent the center thicknesses and air spaces of the respective lenses, $n_1$, $n_2$, . . . represent the refractive indices of the respective lenses, and $\nu_1$, $\nu_2$, . . . represent the Abbe numbers of the respective lenses.

* * * * *